July 6, 1937.　　　　F. A. RESTEL　　　　2,086,477
ELECTRIC BAKING MACHINE
Filed June 16, 1936　　　2 Sheets-Sheet 1

Inventor
F. A. Restel

By Clarence A. O'Brien and
Hyman Berman
Attorneys

July 6, 1937.  F. A. RESTEL  2,086,477
ELECTRIC BAKING MACHINE
Filed June 16, 1936  2 Sheets-Sheet 2
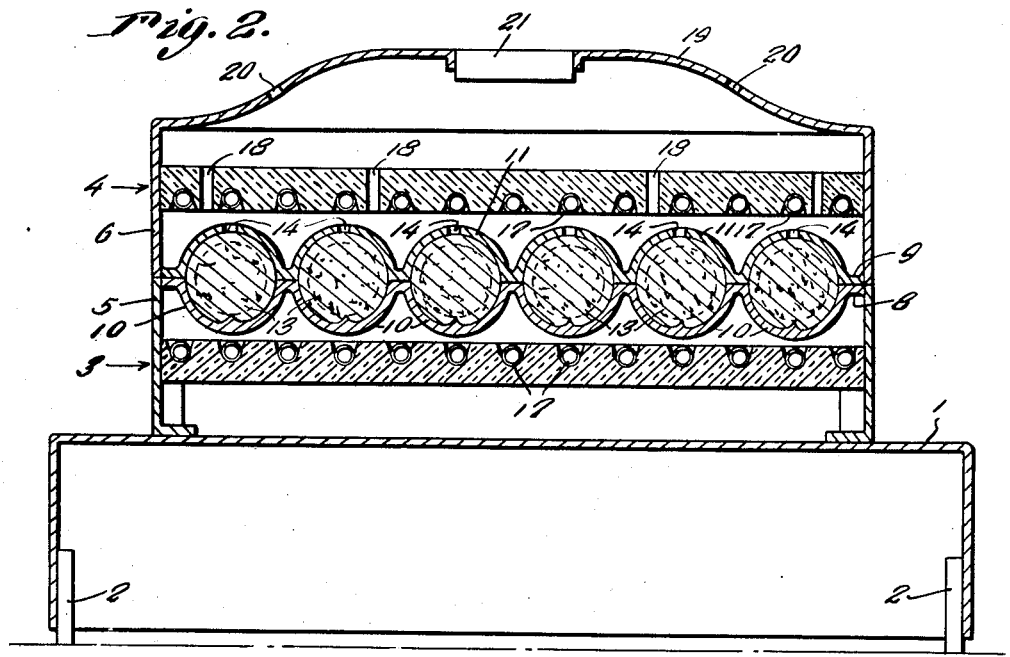
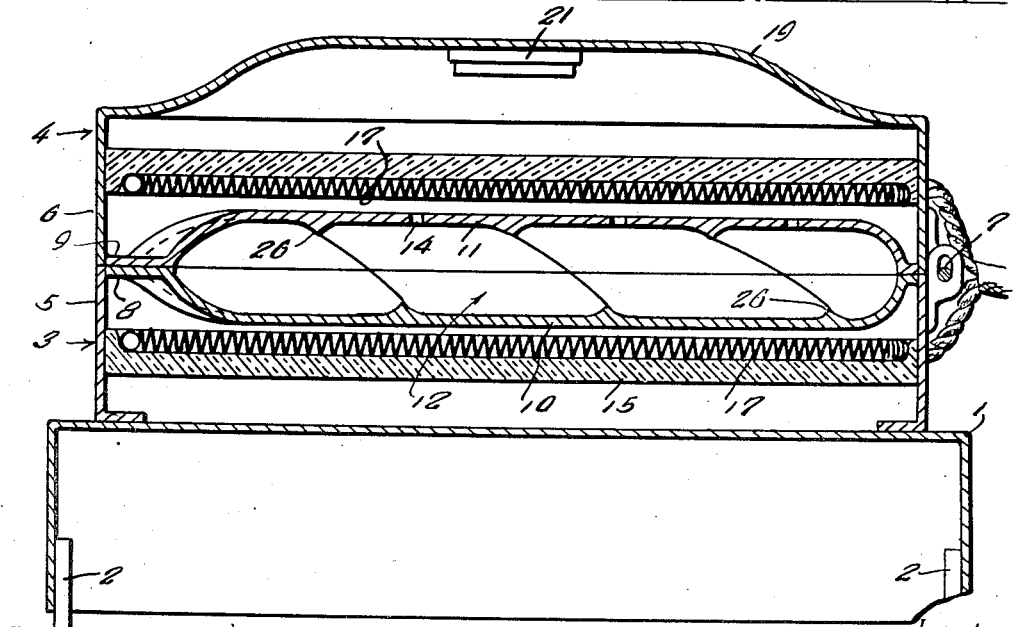
Inventor
F. A. Restel
By Clarence A. O'Brien and Hyman Berman
Attorneys Patented July 6, 1937

2,086,477

UNITED STATES PATENT OFFICE 2,086,477

ELECTRIC BAKING MACHINE

Frank A. Restel, Manhasset, N. Y., assignor to Butter Krisp Manufacturing Corp., Manhasset, N. Y.

Application June 16, 1936, Serial No. 85,585

1 Claim. (Cl. 219—19)

The present invention relates to new and useful improvements in electric cruller baking machines and has for one of its objects to provide, in a manner as hereinafter set forth, a device of this character embodying venting means for the escape of steam during the baking operation, thereby producing crullers which will be greaseless, light and crispy and otherwise highly desirable.

Another very important object of the invention is to provide an electric baking machine of the aforementioned character which is adapted to produce crullers possessing the appearance of having been spirally twisted prior to the baking operation.

Other objects of the invention are to provide an electric cruller baking machine which will be simple in construction, strong, durable, highly efficient and reliable in use, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views and wherein:—

Figure 2 is a view in vertical transverse section through the invention.

Figure 3 is a vertical longitudinal sectional view.

Figure 1:
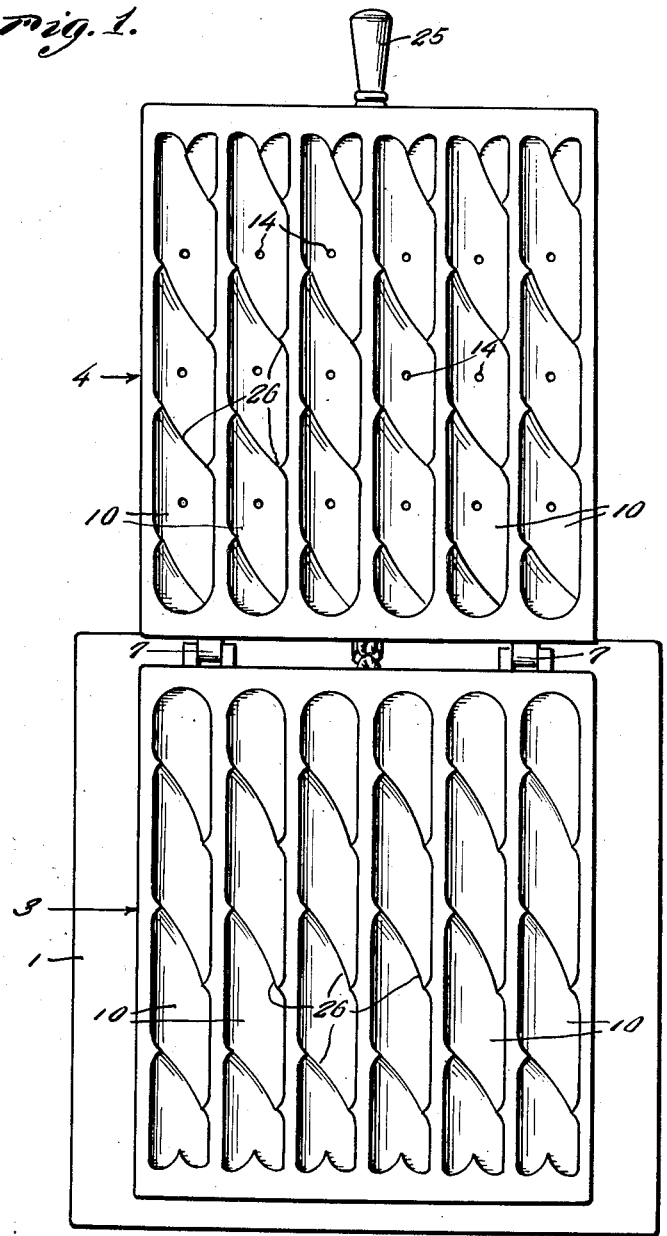
Figure 1 is a top plan view of an electric cruller baking machine constructed in accordance with the present invention, showing the device open.

Referring now to the drawings in detail, it will be seen that the embodiment of the invention which has been illustrated comprises a substantially hollow stand 1 of any suitable dimensions and material, said stand being provided with suitable supporting legs 2. Mounted on the stand 1 is a stationary lower section which is designated generally by the reference numeral 3 and a swinging upper section which is designated generally by the reference numeral 4. The sections 3 and 4 include metallic casings 5 and 6, respectively, the latter being loosely hinged to the former at the rear, as at 7. The sections 3 and 4 further include metallic top and bottom plates 8 and 9, respectively, having formed longitudinally therein complemental grooves or channels 10 and 11, respectively, which, in conjunction with each other, define chambers 12 for the reception of the batter 13. Vents 14 are provided in the upper plate 9 for the escape of steam from the chambers 12 during the baking operation.

The sections 3 and 4 further include insulating plates 15 and 16, respectively, below and above the plates 8 and 9 and in which heating elements 17 are mounted. Plates 15 and 16 are preferably of porcelain and the latter has formed therein vents 18. The upper casing 6 comprises a raised top 19 having vents 20 therein. Also mounted in the top 19 of the casing 6 is a temperature indicator 21.

A handle 25 is provided on the free end of the hinged upper section 4. The walls of the chambers 12 are spirally ribbed, as at 26 (see Figures 1 and 3) for forming spiral grooves in the crullers and imparting to said crullers the appearance of having been spirally twisted.

Briefly, the operation of the device is as follows:

The hinged upper section 4 is swung to open position, as illustrated to advantage in Figure 1 of the drawings, to permit the grooves 10 of the lower section 3 to be filled with the batter, after which said upper section 4 is swung to closed position and the circuit to the elements 17 is closed. As the baking operation progresses the steam which is generated in the batter chambers 12 escapes to the atmosphere through the vents 14, 18 and 20, as is thought to be readily apparent. Of course, the baked crullers are removed from the chambers 12 by again swinging the upper section 4 to open position. The construction and arrangement is such that light, crispy and greaseless crullers are produced.

It is believed that the many advantages of an electric baking machine constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

An electric baking machine comprising a stationary lower section and a swinging upper section hingedly mounted on said lower section, said lower and upper sections including top and bottom plates having complemental grooves therein defining, in conjunction with each other, chambers for the reception of batter, the bottom plate of the upper section further having vents therein for the escape of steam from the chambers, spiral ribs on the walls of the chambers, plates of insulating material mounted in the upper and lower sections adjacent the first named plates, electric heating elements mounted on the second named plates, one of said second named plates having vents therein for the escape of steam, said sections further including casings, the casing of the upper section having vents therein for the escape of the steam to the atmosphere.

FRANK A. RESTEL.